Patented Dec. 29, 1953

2,664,411

UNITED STATES PATENT OFFICE 2,664,411

FLAME-RESISTANT COMPOSITIONS COMPRISING A TRANSPARENT RESIN, CHLORINATED PARAFFIN WAX, AND TRIPHENYL STIBINE

Robert S. Cooper, Park Forest, Ill., assignor to Diamond Alkali Company, Cleveland, Ohio, a corporation of Delaware No Drawing. Application July 21, 1951, Serial No. 238,015

5 Claims. (Cl. 260—28.5)

This invention relates to transparent, flame-resistant, plastic compositions, and more particularly relates to transparent, flame-resistant compositions consisting essentially of an organic, resinous, transparent, plastic material and organic substances which impart flame-resistance to the compositions.

It has heretofore been proposed to render specific transparent, thermoplastic, synthetic resins flame-resistant by incorporating therewith a chlorinated paraffin wax having a chemically combined chlorine content within a limited range, i. e., within the range of 64–68%, in which range the chlorinated paraffin wax is substantially completely soluble in the specific resins involved. This proposal, however, has been found to be limited in its application, in that only a few organic resins fall within the very narrow scope of the proposal.

The present invention has an advantage over the prior art proposals in that it is uniformly applicable to the class of organic, resinous plastic materials which are themselves transparent.

One of the objects of the present invention is to provide organic, resinous, transparent, flame-resistant compositions consisting essentially of a resinous, transparent, organic, plastic material and organic flame-resistant ingredients.

Another object of the invention is to provide a transparent, organic, flame-resistant, plastic composition comprising a chlorinated hydrocarbon and an organic antimony compound.

Pursuant to the above objects, the present invention contemplates employing a transparent, organic, plastic material such as acrylates, for example, polymethyl methacrylate, polystyrene, the polyallyl esters, an example of which is polydiallylethyleneglycoldicarbonate, all of which materials have a very high light transmission (of the order of 90%), as well as vinyl chloride-vinyl acetate copolymers, polyvinyl chloride itself, polyvinylidene chloride, the polyvinyl formal resins, and polyvinyl butyral resins (reaction products of partially hydrolyzed vinyl acetate with formaldehyde and butyraldehyde), polyethylene, the cellulose esters such as cellulose acetate, cellulose acetate butyrate, cellulose propionate, the polyester resins such as the glycerolphthalic anhydride type, super polyamides such as the nylon resins, and chlorinated rubber, in combination with chlorinated paraffin wax having on an average from 18 to 36 carbon atoms and containing from 35–75% of chemically combined chlorine, and triphenyl stibine.

The ingredients of the composition of the present invention may be combined in a dry, comminuted form where the physical properties of the resinous, organic, plastic material permit such procedure, or the resinous, organic, plastic material may be combined with a solution of chlorinated paraffin wax containing from 35–75% of chemically combined chlorine and the triphenyl stibine, in a suitable mixing apparatus such as a Banbury mixer or Day mixer. Where the physical properties of the resinous, organic, plastic material lend themselves to milling of the material on heated rolls, the organic, plastic material may be initially milled on the heated rolls at a temperature of the order of 50° C., or higher, but below the decomposition temperature of the plastic material, to a point where they are readily workable and thereafter the chlorinated paraffin wax and the triphenyl stibine worked into the organic plastic material on the rolls during the milling operation.

The proportion of transparent organic plastic material to the mixture of chlorinated paraffin wax and triphenyl stibine, is preferably within the range of 50–75 parts by weight of the transparent, organic, plastic material, to 50–25 parts of the mixture of chlorinated paraffin wax containing from 35–75% of chemically combined chlorine with triphenyl stibine. The ratio of the chlorinated paraffin wax to the triphenyl stibine is dependent somewhat upon the degree of chlorination of the paraffin wax, the lower the degree of chlorination of the paraffin wax, the greater the amount of triphenyl stibine should be incorporated in the composition in order to render the same flame-resistant. Similarly, the lower the proportion of chlorinated paraffin wax in the flame-resistant composition, the higher should be the proportion of triphenyl stibine. In general, the preferred proportions of chlorinated paraffin wax to triphenyl stibine lie within the range of one part of the chlorinated paraffin wax to 2 parts of the triphenyl stibine, to 2 parts of the chlorinated paraffin wax to 1 part of the triphenyl stibine.

The chlorinated paraffin waxes containing from 35–60% of chemically combined chlorine are normally viscous liquids to semi-solids at room temperatures and such materials may be used in the compositions of the present invention as plasticizers for the resinous, organic, plastic material where such plastic material or the composition warrants the use of a plasticizer, without substantially decreasing the flame-resistant properties of the composition. Chlorinated paraffin waxes containing from 65–75% of chemically combined chlorine are normally resinous materials at room temperature having melting points from about 70° C. to about 100° C., and may be used alone or in combination with chlorinated paraffin wax having a lower degree of chlorination, in the compositions of the present invention in order to impart flame-resistance thereto without materially altering the resinous plastic characteristics of the principal ingredients of the compositions.

The triphenyl stibine is completely compatible with the chlorinated paraffin wax having a chlorine content within the above-noted range, and with the organic, resinous, plastic materials noted hereinabove. Moreover, the triphenyl stibine has been found to act as a plasticizer for the more brittle resins, such as polystyrene and polymethyl methacrylate, while possessing a sufficiently high decomposition temperature (350° C.) to allow for combining a triphenyl stibine with the resinous, organic, plastic materials noted hereinabove under conditions employed for the fabrication of molded or extruded shapes of the plastic material. Further, the triphenyl stibine has been found to impart substantial flame-resistance to the composition of the present invention without altering the transparency of even the most transparent of the above-noted resinous materials.

A specific example will serve to illustrate the formulation of the compositions of the present invention and the manner in which such compositions may be obtained.

EXAMPLE I

Seventy parts by weight of polystyrene are combined with 10 parts by weight of a chlorinated paraffin wax containing approximately 70% of chemically combined chlorine, and 20 parts by weight of triphenyl stibine, all in powdered form. The powdered ingredients are mixed to give a uniform distribution of the polystyrene, chlorinated paraffin wax, and triphenyl stibine, and the mixture placed in a mold 6" x 6" x 0.075". The mold is placed in a heated hydraulic press, and molded at a temperature of 370° F. and a pressure of 1,000 p. s. i. for two minutes. The mold and contents are removed from the hydraulic press and the mold released from the molding. The molding is a clear, light amber, pliable piece. Strips of this molding are tested in accordance with A. S. T. M. Method D-635 to determine the burning rate. The burning rate is found to be nil and the material self-extinguishing.

A composition consisting of 60 parts of polymethyl methacrylate, 20 parts of chlorinated paraffin wax containing 68% of chemically combined chlorine, and 20 parts of triphenyl stibine, all in powdered form, is mixed as described above, and molded. The resulting molding is found to be self-extinguishing and somewhat more pliable than the same resin without the added chlorinated paraffin and triphenyl stibine.

While there have been described various embodiments of the invention, the products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An organic, resinous, transparent, flame-resistant composition consisting essentially of 50-75 parts of a transparent, organic, high polymeric, plastic material, and 50-25 parts of a combination of chlorinated paraffin wax containing from 35-75% of chemically combined chlorine and triphenyl stibine, said chlorinated paraffin wax and said triphenyl stibine being present in said composition in respect of each other in the ratio of 1 part of chlorinated paraffin wax to 0.5-2 parts of triphenyl stibine.

2. An organic, resinous, transparent, flame-resistant composition consisting essentially of 50-75 parts of a transparent, organic, high polymeric, plastic material, and 50-25 parts of the following ingredients: (1) chlorinated paraffin wax containing from 35-60% of chemically combined chlorine, (2) chlorinated paraffin wax containing from 65-75% of chemically combined chlorine, and (3) triphenyl stibine, said chlorinated paraffin wax taken as a single entity and said triphenyl stibine being present in said composition in respect of each other in the ratio of 1 part of chlorinated paraffin wax to 0.5-2 parts of triphenyl stibine.

3. An organic resinous, transparent, flame-resistant composition consisting essentially of 70 parts of a transparent, organic, high polymeric, plastic material, 10 parts of chlorinated paraffin wax containing 65-75% of chemically combined chlorine, and 20 parts of triphenyl stibine.

4. An organic, resinous, transparent, flame-resistant composition consisting essentially of 70 parts of polystyrene, 10 parts of chlorinated paraffin wax containing 70% of chemically combined chlorine, and 20 parts of triphenyl stibine.

5. An organic, resinous, transparent, flame-resistant composition consisting essentially of 60 parts of poly-methyl methacrylate, 20 parts of chlorinated paraffin wax containing 68% of chemically combined chlorine, and 20 parts of triphenyl stibine.

ROBERT S. COOPER.

References Cited in the file of this patent

UNITED STATES PATENTS

| Number | Name | Date |
|---|---|---|
| 2,469,107 | Dimpfl et al. | May 3, 1949 |
| 2,566,208 | Jenkins | Aug. 28, 1951 |
| 2,582,452 | Olson et al. | Jan. 15, 1952 |